United States Patent [19]
Iwanaga

[11] Patent Number: 5,689,487
[45] Date of Patent: Nov. 18, 1997

[54] VERIFY-WHILE-RECORDING DEVICE FOR OPTICAL DISK RECORDING APPARATUS

[75] Inventor: Toshiaki Iwanaga, Tokyo, Japan

[73] Assignee: NEC Corporation, Japan

[21] Appl. No.: 707,243

[22] Filed: Sep. 3, 1996

[30] Foreign Application Priority Data

Sep. 6, 1995 [JP] Japan .................................. 7-229320

[51] Int. Cl.$^6$ .................................................. G11B 7/08
[52] U.S. Cl. .............................. 369/54; 369/58; 369/59; 369/124
[58] Field of Search .............................. 369/54, 58, 42, 369/48, 49, 50, 32

[56] References Cited

U.S. PATENT DOCUMENTS

| | | | |
|---|---|---|---|
| 4,538,257 | 8/1985 | Klinger | 369/50 |
| 4,719,612 | 1/1988 | Kenjyo | 369/58 X |

*Primary Examiner*—Muhammad N. Edun
*Attorney, Agent, or Firm*—Hayes, Soloway, Hennessey, Grossman & Hage, P.C.

[57] ABSTRACT

A verify-while-recording device for an optical recording apparatus includes an optical head, a reproduction amplifier, a timing control circuit, and a recording state determination circuit. The optical head records recording data on an optical disk medium by using a recording beam. The reproduction amplifier reproduces the recording data from the recording beam that is being recorded on the optical disk and outputs a reproduction signal. The timing control circuit outputs a control signal, a timing of which is controlled based on the recording data, and delayed recording data. The recording state determination circuit detects a state change in reproduction signal corresponding to the recording data and obtained from a start time point to a recording end time point, on the basis of the reproduction signal sent from the reproduction amplifier and the control signal and a delayed control signal sent from the timing control circuit and outputs a defective recording signal.

11 Claims, 9 Drawing Sheets

VERIFY-WHILE-RECORDING DEVICE FOR OPTICAL DISK RECORDING APPARATUS

BACKGROUND OF THE INVENTION

The present invention relates to a verify-while-recording device for an optical disk recording apparatus to check the recording state while data is being recorded on an optical disk.

A magneto-optical disk apparatus or a phase change disk apparatus using an erasable optical disk of all the optical disks performs thermal recording in which a laser beam is focused to irradiate an optical disk medium along a groove (guide groove) formed in a substrate in advance, so that information is recorded as a magnetic mark pattern or an amorphous mark pattern on the optical disk medium. This groove is usually formed spirally, and is utilized, in the case of a magneto-optical disk, for performing positioning on a land region serving as an adjacent information track. At this time, a sector format region indicating sector information is formed in the information track in advance as a sector head region. Upon recognition of this preformat, the magneto-optical disk apparatus or the phase change disk apparatus starts recording or reproduction of information. To record or reproduce information on and from the data region divided into sectors, various types of methods have been employed conventionally. For example, a 5-inch magneto-optical disk apparatus uses the mark position recording method for recording. According to this method, information is imparted to the center of a recording mark in accordance with binary information, thereby recording the information. In reproducing and identifying the reproduction data, a readout signal is differentiated to detect the zero-cross point, and simultaneously a reproduction clock determined in accordance with the modulation method is extracted. The pattern of "0" or "1" is determined from the relationship in timing with respect to the data detection window, thereby reproducing information of the original data.

In a magneto-optical disk apparatus for recording or reproducing a large mount of information, the mark edge recording method that imparts the recording mark edge with information is developed for the purpose of increasing the recording capacity. It is known that according to this method, in the ideal case, the recording density can be doubled as compared to that of mark position recording. In reproduction, the edge information is detected by changing the recording data into the form of pulses with reference to a fixed slice level, and simultaneously, a reproduction clock determined in accordance with the modulation method is extracted. The pattern of "0" or "1" is determined from the relationship in timing with respect to the data detection window, thereby reproducing information of the original data.

Conventional magneto-optical disk recording apparatus does not have an overwrite function unlike in a magnetic recording apparatus, and dust tends to attach and scars can be formed easily. Therefore, in order to ensure the reliability of the data, a verify operation must be performed after data recording. For this reason, high-speed recording cannot be performed. More specifically, conventionally, three processes (a time period corresponding to three revolutions of the disk) including data erasing, data recording, and recording data verifying are required.

As a matter of course, a magneto-optical disk medium having an optical modulation overwrite function is developed recently, and standardization of such a disk as well as mark edge recording is under discussion for a next-generation optical disk. An optical disk apparatus using a phase change disk of mark position recording, which has an optical modulation overwrite function, has also been introduced, and discussion for standardization of such an apparatus is also started.

Regarding the verify operation, however, except for a normal verify operation which is performed after one revolution upon recording and applied to a conventional product, only expensive methods have been proposed such as a serial verify operation which is performed with a two-beam optical head or two optical heads.

Figure 11:
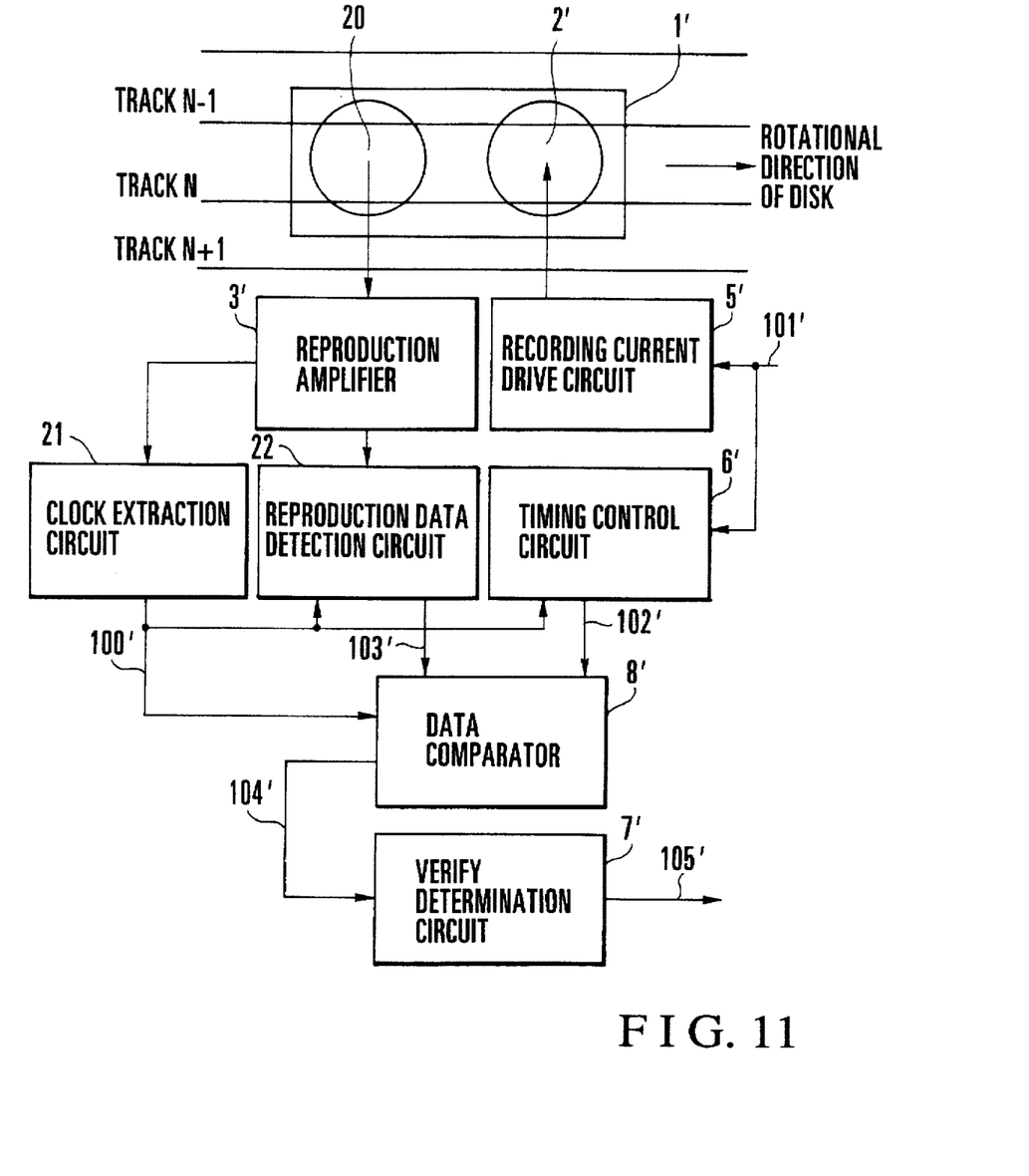
FIG. 11 is a block diagram showing a conventional magneto-optical disk recording apparatus.

A magneto-optical disk recording apparatus having such an expensive verify function will be described with reference to FIG. 11. FIG. 11 shows a conventional magneto-optical disk recording apparatus. For recording and reproduction, a two-beam optical head 1' having a reproduction beam 20 and a recording beam 2' is used. Recording is performed on a track N. Recording data 101' is mark-edge-recorded on a magneto-optical disk medium with the recording beam 2' through a recording current drive circuit 5'. The recorded data is read out by the reproduction beam 20 and is output to a reproduction amplifier 3'. The reproduction amplifier 3' amplifies the magneto-optical readout signal and outputs it to a clock extraction circuit 21 and a reproduction data detection circuit 22. The clock extraction circuit 21 extracts a clock from the magneto-optical readout signal, and outputs a reproduction clock 100' to the reproduction data detection circuit 22, a timing control circuit 6', and a data comparator 8'. The reproduction data detection circuit 22 binarizes the readout signal amplified by the reproduction amplifier 3', latches the obtained binary signal with the reproduction clock 100' supplied from the clock extraction circuit 21, and outputs the latched signal to the data comparator 8'. The data comparator 8' receives the reproduction clock 100', delayed recording data 102' subjected to timing matching by the timing control circuit 6', and an output 103' from the reproduction data detection circuit 22 as the inputs, and compares the delayed recording data 102' with the output 103'. After data comparison, the data comparator 8' outputs a defective recording signal 104'. When the defective recording signal 104' is output from the data comparator 8' to a verify determination circuit 7', the verify determination circuit 7' outputs a verify determination signal 105' in order to check the state of the information signal recorded on the magneto-optical disk. This method has drawbacks in that the head is expensive, alignment of the two beams on the recording track is difficult, and extraction of the reproduction clock must be performed, leading to a complicated arrangement. For this reason, the problem of a long recording time which is twice or more that of the magnetic disk is left unsolved.

Japanese Patent Laid-Open No. 5-62273 proposes an "optical disk recording device" as an example of a means that shortens the time required for a verify operation while recording of a magneto-optical disk recording device, thereby shortening the recording time. According to this device, while recording, the level of a reproduction sum signal (an RF signal in this reference) from the optical head is detected by a level detection circuit. A verify operation is performed only when the level of the reproduction sum signal becomes lower than a predetermined value. When the level of the reproduction sum signal is equal to or higher than the predetermined value, the verify operation while recording is not performed. The recording time is shortened since not all recorded data are verified.

Also, Japanese Patent Laid-Open No. 57-12629 proposes an "optical information recording device" as an example of a rewritable optical disk, although this is not a magneto-optical disk. According to this device, a verify operation is performed by monitoring the quantity of reflected light (which is synonymous with the reproduction sum signal in the magneto-optical disk) while recording. This method is basically the same as that of Japanese Patent Laid-Open No. 5-62273 described above.

According to these methods, basically, a change in quantity of reflected light is monitored as a change over a long period of time (a change in envelope) and not in the bit-by-bit manner, so that whether a fine verify operation should be performed or the sector in question should be regarded as a substitute sector can be determined. However, these methods have drawbacks as follows.

In the conventional optical disk recording device described above, in the method of performing a verify operation based on a change in quantity of reflected light, if the quantity of reflected light changes due to oils and fats or dust attaching to the surface of the magneto-optical disk substrate, this change is immediately determined to indicate a defect. However, regarding the reproduction signal of a magneto-optical disk, as is apparent from the performance index approximately defined by the product of "the square root of the reflectance of the magneto-optical disk medium" and "the Kerr rotation angle", it is known that a decrease in reflectance sometimes approximately leads to an increase in Kerr rotation angle. Therefore, if the occurrence of a defect is determined merely because the reflectance changes and a verify operation is performed, a problem remains in the reliability of the verify operation.

For this reason, in such a case, verify-while-recording becomes meaningless, and so-called fine verify check which is performed after the disk is rotated through one or more revolutions after data recording is performed, which is not effective.

In the conventional method described above, the verify operation is performed by monitoring a change in envelope of the quantity of reflected light. Thus, this method cannot be applied to a case which is greatly influenced by a recording mark which has been recorded in advance, as in a phase change overwrite medium. More specifically, in a spot-recording phase change disk, when, e.g., a recording mark which is to be currently recorded overlaps the amorphous mark of a previous recording mark, as the reflectance of the amorphous mark is low, the recording mark may be erroneously determined as a defect, which poses a problem in terms of the reliability of the verify operation.

Also, even when degradation of the optical head or the like occurs and the focused beam irradiates the magneto-optical disk medium in the defocused state, the quantity of light reflected by the magneto-optical disk medium is sometimes output correctly. Then, it can be erroneously determined that recording is performed correctly and that a fine verify operation need not be performed, leading to a problem in terms of the reliability of the verify operation.

SUMMARY OF THE INVENTION

It is an object of the present invention to provide a verify-while-recording device for an optical disk recording apparatus in which the verify operation of various types of optical disks while recording is simplified.

It is another object of the present invention to provide a verify-while-recording device for an optical disk recording apparatus in which the recording speed can be increased.

In order to achieve the above objects, according to the present invention, there is provided a verify-while-recording device for an optical recording apparatus, comprising an optical head for recording recording data on an optical disk medium by using a recording beam, signal reproducing means for reproducing the recording data from the recording beam that is being recorded on the optical disk and outputting a reproduction signal, timing control means for outputting a control signal, a timing of which is controlled based on the recording data, and delayed recording data, and recording state determining means for detecting a state change in reproduction signal corresponding to the recording data and obtained from a start time point to a recording end time point, on the basis of the reproduction signal sent from the signal reproducing means and the control signal and a delayed control signal sent from the timing control means, and outputting a defective recording signal.

DESCRIPTION OF THE PREFERRED EMBODIMENTS

In magneto-optical recording, a magneto-optical readout signal in a region which is irradiated for recording with a focused beam that moves at a certain speed relative to the medium is always read out by a reproduction amplifier for differential amplification even when the recording power is irradiated. Thus, the readout signal changes approximately in proportion to the product of the quantity of light reflected by the medium and the Kerr rotation angle. For example, a magneto-optical readout signal immediately after the start of recording by about up to 10 ns increases sharply in proportion to the product of the reflectance of the medium with a recording power PW and the Kerr rotation angle (e.g., $-\theta k$) at a medium temperature. Thereafter, the medium temperature increases sharply to reach or exceed the Curie point (e.g., 200° C.) in some region in the focused beam spot, so that the Kerr rotation angle disappears. For this reason, the magneto-optical readout signal decreases to be equal to or lower than the amplitude level obtained with a reproduction power Pr, and remains at a constant value or continues to decrease until recording is ended. Therefore, the magneto-optical readout signal takes a peak value. When recording is ended, the quantity of light returns to what is obtained with the reproduction power Pr, so that the medium temperature decreases abruptly. At this time, as the Kerr rotation angle within the region where recording is performed becomes +θk, it becomes +θk behind the moving beam and becomes −θk ahead of the moving beam within the focused beam region. At this time, the signal output that has continued to decrease further decreases to quickly return to the amplitude level obtained while reproduction. Therefore, a small peak of an inverted form of that of the above-mentioned peak appears immediately after recording is ended.

In this manner, conditions necessary for knowing whether thermo-magnetic recording has been performed can be observed. To measure the sufficient conditions, after thermo-magnetic recording is ended, information must be actually reproduced with a reproduction power, as a matter of course. Also, when a verify-while-recording operation is performed by only checking the quantity of reflected light (e.g., the sum signal of a magneto-optical reproduction signal), small scars of the magneto-optical disk medium and surface stains that do not actually cause a problem may be erroneously determined to cause a problem. For this reason, if a verify-while-recording operation is performed by using a magneto-optical reproduction signal while recording, whether thermo-magnetic recording has been executed can be checked. For example, when the magnetic film peels off or is corroded for some reason, the magneto-optical signal while recording does not change in the manner as described above. Thus, defective recording can be checked, thereby enabling a verify-while-recording operation.

When degradation of the optical head or the like occurs and the focused beam is defocused, although the quantity of reflected light is output correctly, the magneto-optical signal while recording does not change in the manner as described above. Thus, the reliability becomes higher than in a case wherein the verify operation is performed by using only the quantity of reflected light.

In a phase change disk, an amorphous mark is recorded on a crystalline state portion, and reproduction is realized by using only a change in quantity of reflected light (reflectance Rc of the crystal region>reflectance Ra of the amorphous mark). If a previous mark does not exist on the recording medium, within a region which is irradiated for recording with a focused beam while recording, the readout signal increases abruptly immediately after the start of recording by about up to 10 nm in proportion to the recording power Pw. Thereafter, the medium temperature increases abruptly, and some region within the focused beam spot becomes molten (to have a reflectance of Rm at, e.g., 600° C.) and some region within the focused beam spot becomes amorphous. Thus, the readout signal decreases to maintain a relationship Rc>Ra>Rm until recording is ended. Therefore, the readout signal takes, e.g., a positive peak value. When recording is ended, the quantity of light returns to what is obtained with the reproduction power Pr, so that the medium temperature decreases abruptly. At this time, the amorphous region where recording is performed increases relatively, and then decreases abruptly. Thereafter, within the focused beam region, since the beam moves, the crystal region increases, and the signal output which has been decreasing quickly returns to the amplitude level obtained while reproduction. As a result, a negative peak which is of an inverted form of the positive peak described above appears immediately after the end of recording. In this manner, conditions necessary for knowing whether thermal recording has been performed can be observed. According to the principle of the phase change disk, a change in quantity of reflected light is utilized. Since a change in reflected light while recording is monitored bit by bit, the recording state can be detected correctly. As described above, although the principle of recording and reproduction of a recording mark differs between a magneto-optical disk and a phase change disk, a change in signal which is read out while recording is almost the same. Thus, the verify-while-recording device according to the present invention can be applied to both the magneto-optical disk and the phase change disk.

Also in an optical modulation overwrite operation, although the principle of recording and reproduction of the recording mark differs between the magneto-optical disk and the phase change disk, a change in signal which is read out while recording is almost the same. More specifically, when a previous recording mark exists, if the previous recording mark overlaps the current recording mark, regarding a change in signal which is read out while recording, the signal amplitude becomes smaller than in a case wherein a previous recording mark does not exist. Then, the SN ratio is decreased and the region in question is observed as a defective region. For this reason, according to the verify-while-recording device of the present invention, the reliability of the verify operation can be improved by monitoring portions before and after the recording mark which is to be currently recorded bit by bit.

Even when degradation of the optical head or the like occurs and the focused beam is irradiated on the magneto-optical disk medium in the defocused state, the quantity of reflected light is sometimes output correctly, and it can be erroneously determined that a verify operation need not be performed. In contrast to this, according to the verify-while-recording device of the present invention which detects a change in optical signal while recording, since an increase in temperature of the optical disk recording film can be detected, the reliability of the verify operation is improved.

Figure 1:
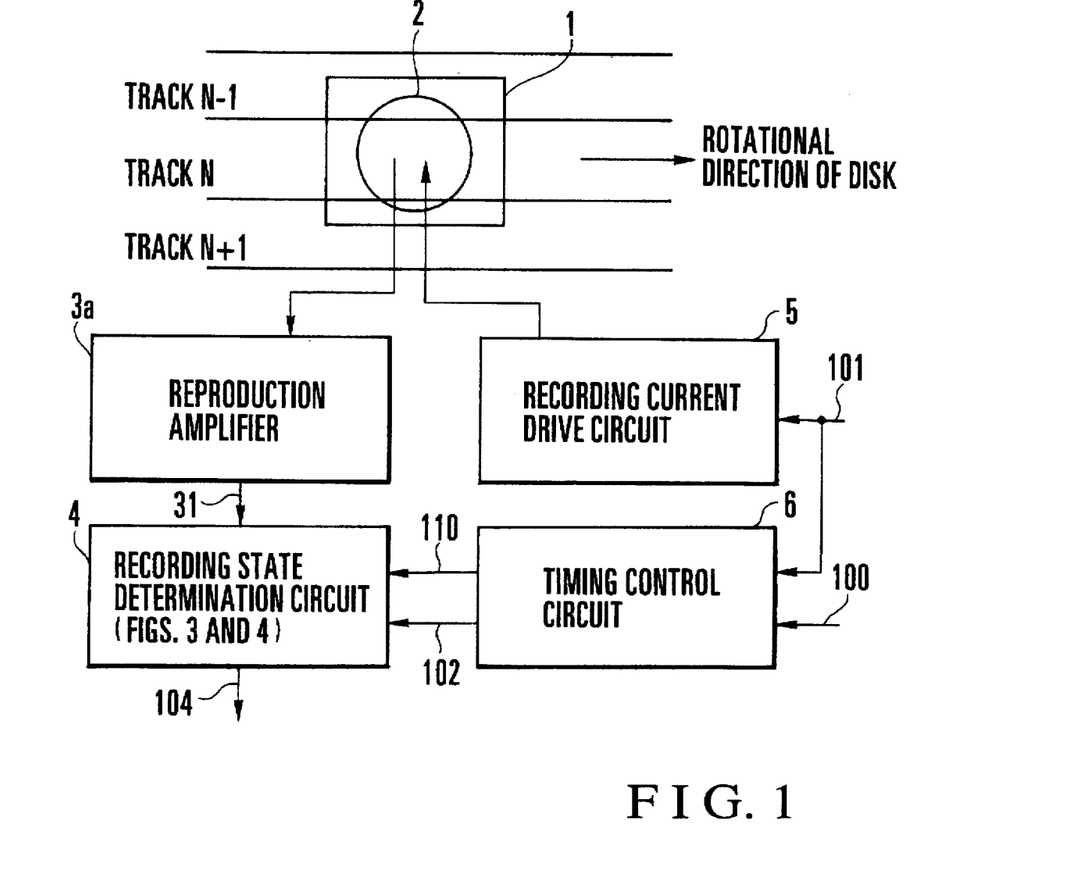
FIG. 1 is a block diagram showing a verify device according to the first embodiment of the present invention.

The preferred embodiments of the present invention will be described with reference to the accompanying drawings. FIG. 1 shows a verify-while-recording device according to the first embodiment of the present invention. Although the operation of the device will be described briefly by way of a magneto-optical disk, the same principle applies to non-overwritable phase change disk or writing-once disk. A description will be made by employing the (1,7) RLL (Run Length Limited code) method as the modulation method.

For recording and reproduction, a normal one-beam optical head 1 is used. Recording is performed on a track N. Recording data 101 synchronized with a recording clock 100 is mark-edge-recorded on a magneto-optical disk medium with a recording beam 2 through a recording current drive circuit 5. Simultaneously, a reproduction amplifier 3a monitors the magneto-optical information light while recording, and outputs a reproduction signal 31 to a recording state determination circuit 4. Based on the reproduction signal 31 which fluctuates along with a change in magneto-optical information light, the recording state determination circuit 4 detects a defective recording signal 104 by using delayed recording data 102 and a reset signal 110 which are subjected to timing matching by a timing control circuit 6. The timing control circuit 6 receives the recording clock 100 and the recording data 101 as the inputs and outputs, to the recording state determination circuit 4, the delayed recording data 102 obtained by delaying the recording data 101 and the reset signal 110 synchronized with the recording data 101.

Figure 2:
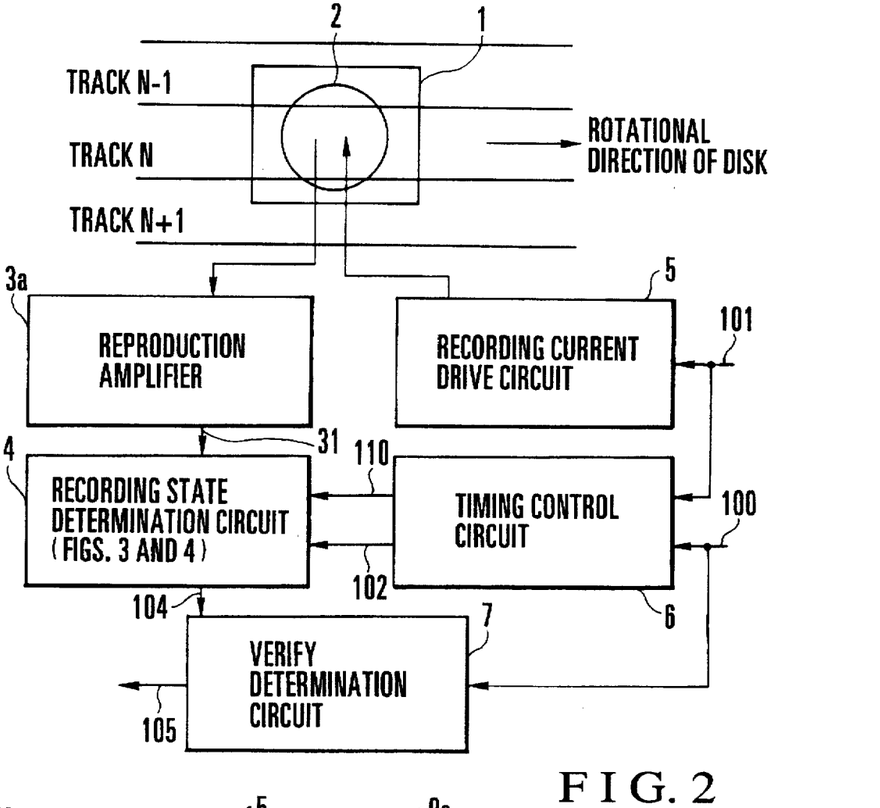
FIG. 2 is a block diagram showing a verify device according to the second embodiment of the present invention.

FIG. 2 shows a verify-while-recording device according to the second embodiment of the present invention. Although the operation of the device will be described briefly by way of a magneto-optical disk, the same principle applies to a non-overwritable phase change disk. The second embodiment is different from the first embodiment shown in FIG. 1 in that a verify determination signal 105 is output from a verify determination circuit 7 constituted by, e.g., a latch circuit and a counter circuit, based on a defective recording signal 104 supplied from a recording state determination circuit 4. The verify determination circuit 7 outputs the verify determination signal 105 when defective recording signals 104 of a count exceeding the count of defective recording signals which is set in the system in advance are counted. In this case, whether the defective recording region is to be skipped or a normal verify operation (a fine verify operation which is performed after the disk is rotated for recording) is to be performed can be determined by, e.g., a preset counter count. Of course, when a fine verify operation is not performed but the defective recording region is skipped, this region is substituted as a substitute sector after the disk is rotated for recording. In this manner, the verify operation may be selected in terms of the recording speed, cost, reliability, and the like in accordance with the application of the optical disk device. In FIG. 2, the verify determination circuit 7 uses a recording clock 100 in order to improve the reliability. However, as the defective recording signal 104 is clock-synchronized, the clock 100 need not be used.

Figure 3:
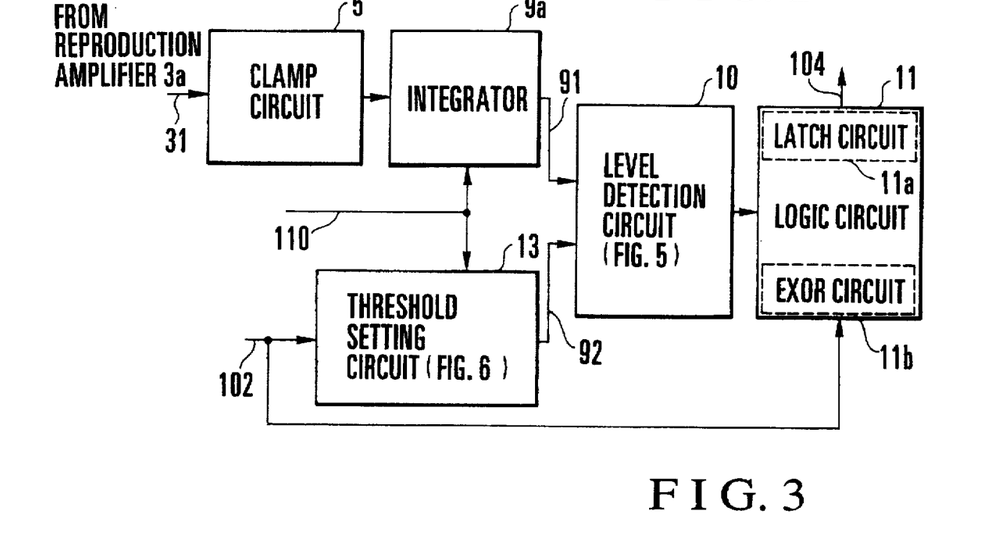
FIG. 3 is a block diagram showing the first arrangement of a recording state determination circuit shown in FIG. 1 or 2.
Figure 4:
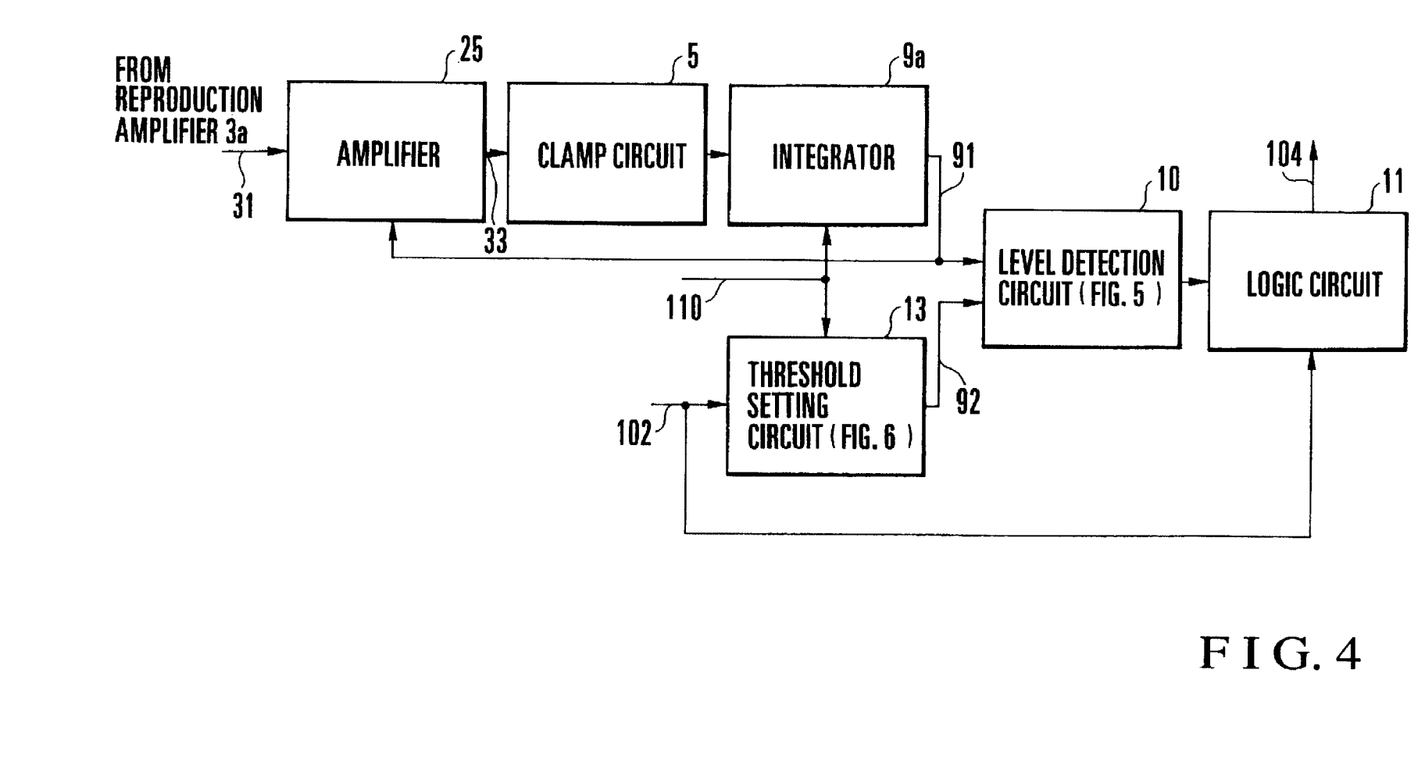
FIG. 4 is a block diagram showing the second arrangement of the recording state determination circuit shown in FIG. 1 or 2.

FIGS. 3 and 4 respectively show the first and second arrangements of the recording state determination circuit 4 shown in FIG. 1 or 2. The recording state determination circuit of the first arrangement shown in FIG. 3 is constituted by a clamp circuit 5, an integrator 9a having a reset function, a threshold setting circuit 13, a level detection circuit 10, and a logic circuit 11. The clamp circuit 5 receives the signal output 31 from the reproduction amplifier as the input and clamps the peak value of the amplitude of the reproduction signal to a predetermined voltage. The integrator 9a integrates the reproduction signal 31 while recording, which is clamped by the clamp circuit 5, for a predetermined period of time. The threshold setting circuit 13 integrates the delayed recording data 102 for a predetermined period of time and outputs a threshold. The level detection circuit 10 receives, as the inputs, an integral value 91 which is an output from the integrator 9a and a threshold 92 which is an output from the threshold setting circuit 13, and compares their amplitudes. The logic circuit 11 is constituted by a latch circuit 11a and an EXOR (Exclusive OR) circuit 11b and outputs the defective recording signal 104 based on the output from the level detection circuit 10 and the delayed recording data 102.

Figure 5:
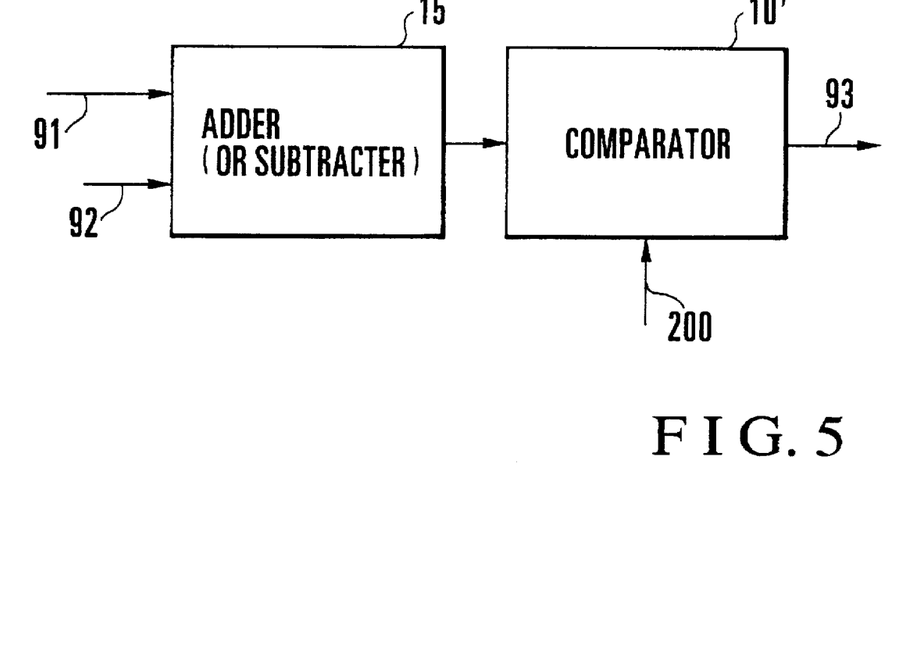
FIG. 5 is a block diagram of a level detection circuit shown in FIG. 3 or 4.

The clamp circuit 5 can be easily constituted by, e.g., a diode circuit which receives an output from a capacitor. For the sake of simplicity, the level detection circuit 10 may be constituted by a high-speed comparator which compares the amplitudes, but may also be constituted by an adder (or a subtracter) 15 and a comparator 10', as shown in FIG. 5, on behalf of the controllability of the arrangement of the optical disk apparatus. The adder (or the subtracter) 15 performs addition (or subtraction) of the integral value 91 and the threshold 92. The comparator 10' compares the amplitudes of the output from the adder 15 and a threshold voltage 200, which is preset by, e.g., a D/A converter, as a reference potential. The adder or subtracter is employed since addition is performed when the respective signals have opposite polarities and subtraction is performed when the respective signals have the same polarity.

Figure 6:
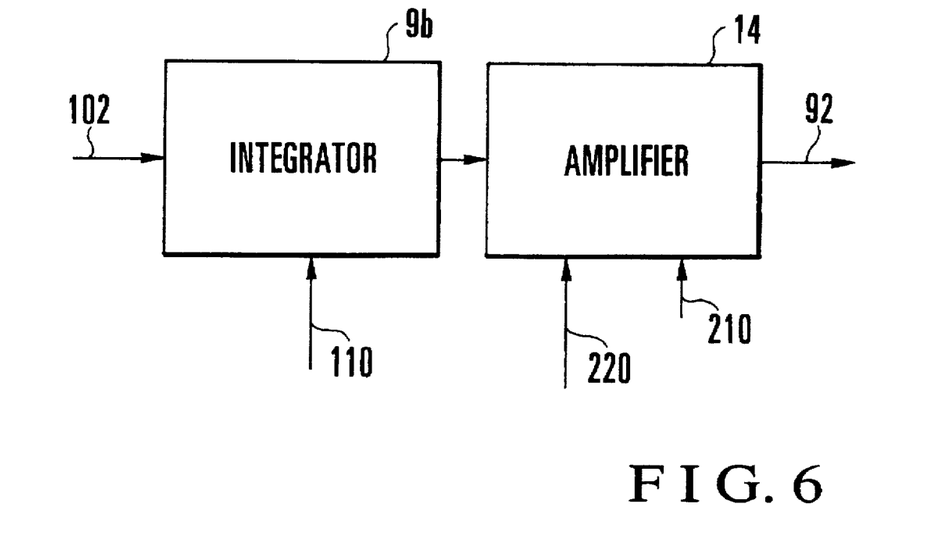
FIG. 6 is a block diagram of a threshold setting circuit shown in FIG. 3 or 4.

The threshold setting circuit 13 is constituted by an integrator 9b having a reset function and an amplifier 14, as shown in FIG. 6. The integrator 9b integrates the delayed recording data 102. The amplifier 14 amplifies the threshold signal 92 to an appropriate value. The integrator 9b integrates the delayed recording data 102 input at, e.g., a TTL (Transistor-Transistor Logic) level, by a preset time constant. The integrators 9a and 9b respectively shown in FIGS. 3 and 6 may comprise LPFs (Low-Pass Filters). The integrator and LPF are synonymous to each other in terms of technology. If the integrators 9a and 9b do not have the reset function, the integrating potential varies to disable accurate level detection, thus disabling a verify-while-recording operation in the bit-by-bit manner. The integrators 9a and 9b have the reset function in order to prevent this.

The recording state determination circuit of the second arrangement shown in FIG. 4 is obtained by further arranging, e.g., an amplifier 25 capable of voltage-controlling the gain, in the input stage of the clamp circuit 5 of the recording state determination circuit of the first arrangement shown in FIG. 3. The amplifier 25 is arranged due to the following reason. When the relative linear speed of the focused beam and the disk medium differs between the inner and outer portions of the disk, or when the recording/reproduction characteristics differ depending on the disk manufacturers, the waveform of a reproduction signal 31 while recording as an output from a reproduction amplifier 3a changes. More specifically, a decrease amount in amplitude level after the peak is decreased, and an output 91 from the integrator 9a is decreased. Therefore, the amplifier 25 sets a change in gain for each linear speed, thus maintaining the integral signal 91 to a predetermined amplitude. Hence, although not shown in FIG. 4, to set the gain, a control voltage is generated by, e.g., an LPF, based on the integral signal 91. Although not shown in FIG. 4, a control voltage may be output for each disk linear speed under the system control by using a ROM (Read-Only Memory) and a D/A converter.

FIG. 5 shows an arrangement of the level detection circuit 10 shown in FIG. 3 or 4. Regarding the level detection circuit of the present invention, for the sake of simplicity, it may basically comprise a high-speed comparator which compares the voltage amplitude with a preset threshold. Because of the arrangement of the optical disk apparatus, in order to improve the controllability, this level detection circuit may comprise a comparator which receives the addition or subtraction result of the integral 91 and the threshold 92 described above as its one input, and compares the amplitude of this input with the threshold voltage 200 preset by a D/A converter or the like as a reference potential. At this time, the adder or subtracter is employed since addition is performed when the respective signals have opposite polarities and subtraction is performed when the respective signals have the same polarity.

FIG. 6 shows an arrangement of the threshold setting circuit 13 shown in FIG. 3 or 4. The threshold setting circuit 13 according to the present invention is constituted by the integrator 9b having a reset function and an amplifier 14. The integrator 9b integrates the delayed recording data 102. The amplifier 14 amplifies the threshold signal 92 to an appropriate amplitude value. The integrator 9b integrates the delayed recording data 102 input at, e.g., a TTL level, by a preset time constant. With this arrangement which integrates the recording data and outputs the threshold signal, the following effects can be obtained. Since a signal which is read out while recording is integrated, the integral value has a dependency on the recording mark length (time). When the recording mark is shortened, the integral amplitude is decreased. Accordingly, as the reference potential which is the threshold of the comparator, a fixed value is not used but a variable value which is obtained by integrating the recording data is used. As a result, accurate amplitude comparison can be performed.

Figure 7A:
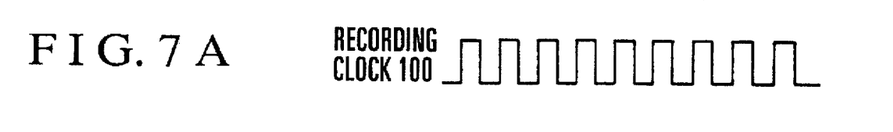
FIGS. 7A to 7I are timing charts for explaining the verify-while-recording operation of the verify devices shown in FIGS. 1 and 2.
Figures 7B, 7C:
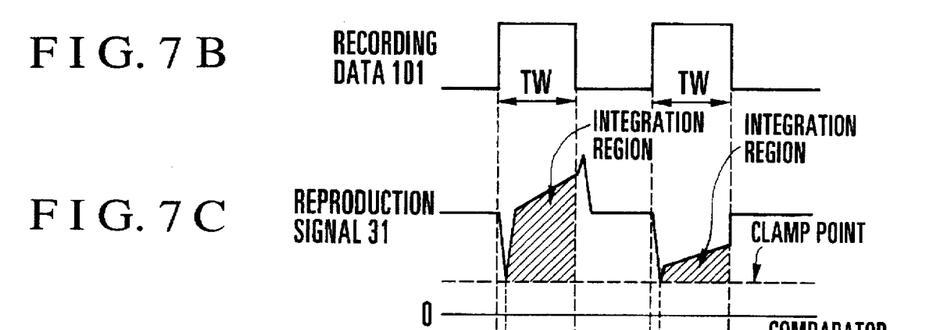

The verify-while-recording operation of the verify devices shown in FIGS. 1 and 2 will be described with reference to the timing charts of FIGS. 7A to 7I. In synchronism with a recording gate signal (not shown) serving as a recording start signal synchronized with the recording clock 100 shown in FIG. 7A, the recording data 101 having a recording pulse width TW is output to the recording current drive circuit 5, as shown in FIG. 7B, and is recorded on the magneto-optical disk medium. As described previously, within a region irradiated with a focused beam that moves at a certain speed relative to the medium, the reproduction signal 31 output from the reproduction amplifier 3a changes approximately in proportion to the product of the quantity of irradiated light and the Kerr rotation angle, as shown in FIG. 7C. Although a circuit time delay is present before the edge position signal of the recording data in an actual circuit, it is omitted in FIG. 7B for the sake of simplicity.

Figure 7D:
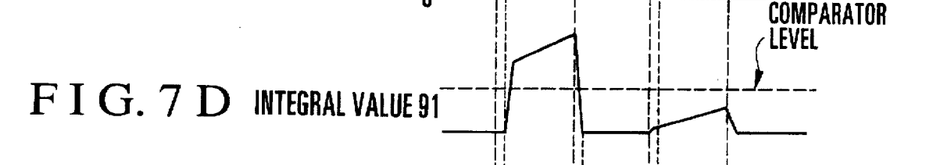

The clamp circuit 5 of the recording state determination circuit 4 shown in FIG. 3 receives this reproduction signal 31 as the input and clamps it as shown in FIG. 7C, thereby fixing its level. Thereafter, the integrator 9a having the reset function integrates, e.g., only a hatched region shown in FIG. 7C, thus obtaining the integral signal 91 shown in FIG. 7D. The reset function can be easily obtained by, e.g., an analog switch. At this time, the reset signal 110 is output after it is subjected to timing adjustment by the timing control circuit 6 based on the recording data 101 so that it is synchronized with the reproduction signal 31. The integrator 9a performs integration, as a matter of course. However, this integration can be achieved by an LPF merely having a reset function, and by a filter merely having a reset function whose LPF time constant is larger than the pulse width, as shown in FIG. 7D. Integration is performed for the purpose of improving the resistance to noise.

Figures 7E, 7F:
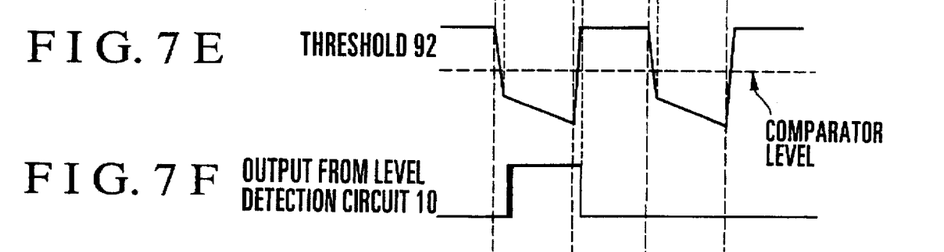

In the threshold setting circuit 13 shown in FIG. 6, the delayed recording data 102, obtained by adjusting the timing of the recording data 101 by the timing control circuit 6 to be synchronized with the reproduction signal 31, is integrated by the integrator 9b having the reset function. The reset signal 110 used at this time can be obtained only by finely adjusting the timing of the reset signal 110 used by the integrator 9a. The output from the integrator 9b is subjected to gain change and offset addition in accordance with whether the current sector is on the inner or outer portions of the disk and with the type of disk medium, so that an optimum threshold signal 92 can be output. In FIG. 7E, the polarity of the threshold signal 92 is inverted.

Figure 7G:
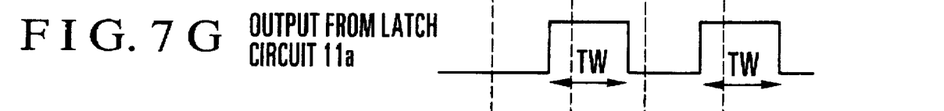
Figure 7H:
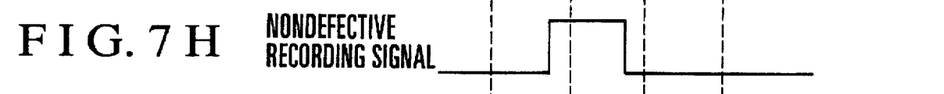
Figure 7I:
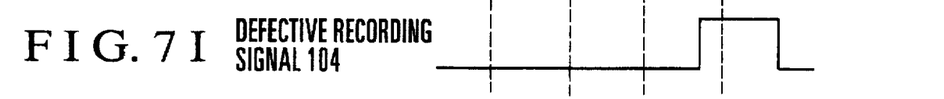

The level detection circuit 10 comprising a comparator and the like shown in FIG. 3 can output only a nondefective recording signal shown in FIG. 7F which is obtained based on the waveforms shown in FIGS. 7D and 7E with reference to the comparator levels as the boundaries. The front edge of the output of the level detection circuit 10 is not fixed on the time axis. On the contrary, the rear edge of the output of the level detection circuit 10 is fixed partly because it is reset by the integrators 9a and 9b. Therefore, as shown in FIG. 7G, the logic circuit 11 latches the output from the level detection circuit 10 at a time point before its rear edge by a certain time period (e.g., about 10 ns) with the latch circuit 11a by using the delayed recording data 102, and is reset by the rear edge of the delayed recording data 102. Thus, the logic circuit 11 can output the nondefective recording signal as a clock-synchronized signal, as shown in FIG. 7H. As the delayed recording data 102 and the nondefective recording signal are compared by the EXOR circuit 11b, the defective recording signal 104 can be output as the recording pulse width TW of the defective recording region, as shown in FIG. 7I. In other words, when the nondefective recording signal is not output, the defective recording signal 104 is output. In this manner, the logic circuit 11 can be constituted by the latch circuit 11a and the EXOR circuit 11b. Therefore, in the present invention, the logic circuit 11 can output both the defective recording signal 104 and the nondefective recording signal.

Figure 8:
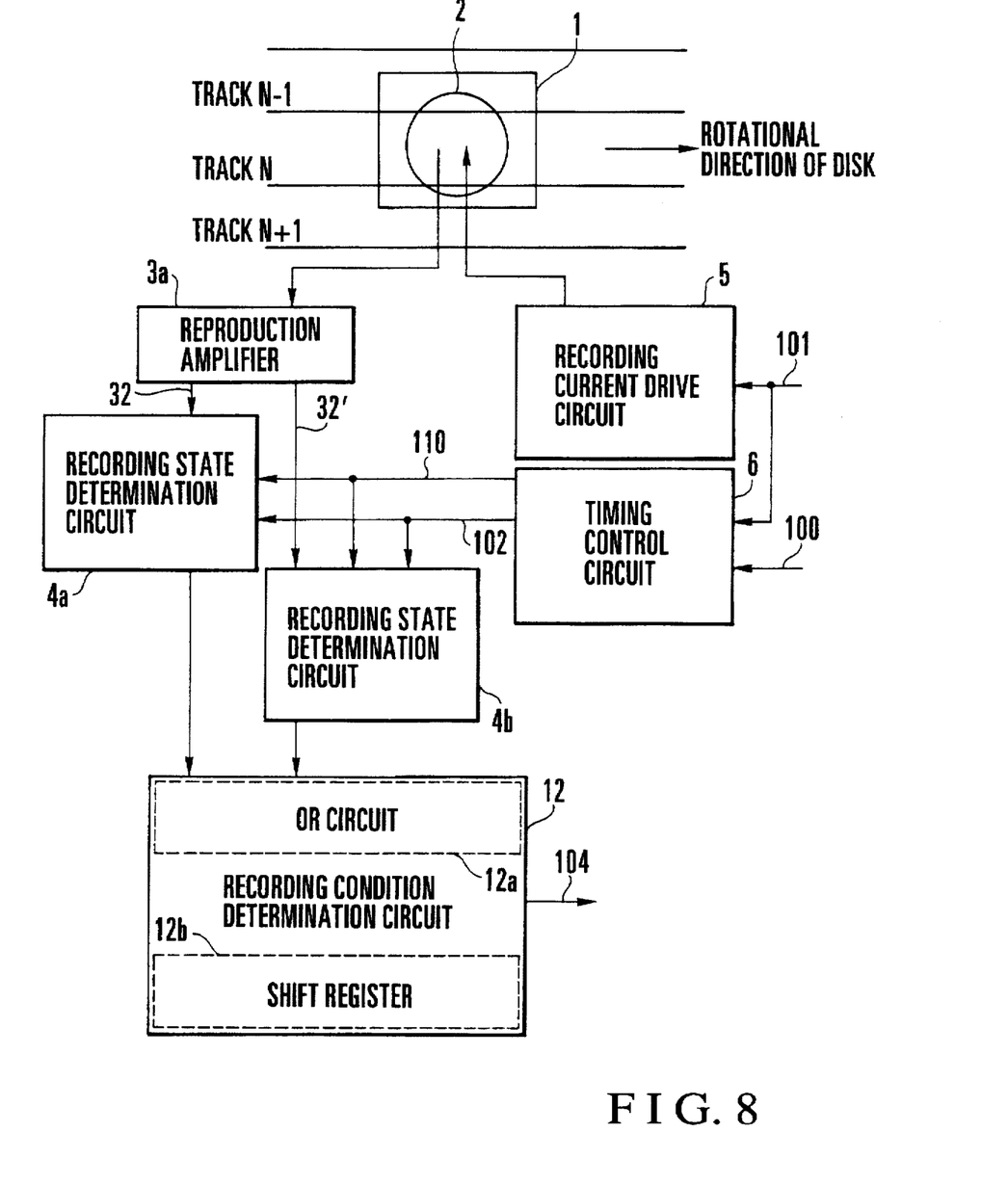
FIG. 8 is a block diagram showing a verify device according to the third embodiment of the present invention.

FIG. 8 shows a verify-while-recording device according to the third embodiment of the present invention, and FIGS. 10A to 10I show the verify-while-recording operation of this device. Although the operation of the device will be described briefly by way of an overwritable 2-7 modulation mark position phase change disk, the same principle applies to an overwritable magneto-optical disk. The third embodiment can also be applied to non-overwritable magneto-optical disk, phase change disk, and writing-once disk so that the reliability of the verify operation can be further improved. More specifically, unlike in the first and second embodiments, since monitoring can be performed also during a period when the recording optical power is not irradiated, for example, an erase state can also be checked, thus serving to check defective initialization of the medium.

Figure 10:
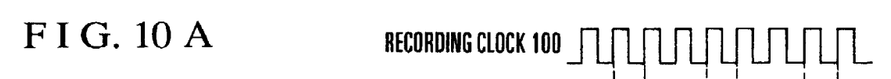
FIGS. 10A to 10I are timing charts for explaining the verify-while-recording operation of the verify devices shown in FIGS. 8 and 9.

For recording and reproduction, a normal one-beam optical head 1 is used. Recording is performed on a track N. Recording data 101 shown in FIG. 10B which is synchronized with a recording clock 100 shown in FIG. 10A is mark-edge-recorded on an optical disk medium with a recording beam 2 through a recording current drive circuit 5. Simultaneously, a reproduction amplifier 3a outputs differential signal outputs 32 and 32' of reflected light information while recording to recording state determination circuits 4a and 4b. The same effect can be obtained if two phase signal outputs having the same phase are output in place of the differential signal outputs, as a matter of course. At this time, the recording state determination circuit 4a or 4b must have a circuit arrangement for determining the polarity, which is cumbersome. Therefore, in the present invention, outputs from a differential amplifier, which are generally employed in a reproduction amplifier, are used. Therefore, the recording state determination circuits 4a and 4b can have substantially the same arrangement except for the polarity of the reset signal and the like.

The recording state determination circuit 4a receives the signal output 32 from the reproduction amplifier 3a as the input and clamps its positive peak value (corresponding to the recording data start time point) at the clamp point shown in FIG. 10C by using the determination circuits described with reference to FIGS. 3 and 4, and integrates a reproduction signal corresponding to the recording data 101 and obtained from the start time point to the recording end time point, thereby performing state detection. As the integration range, a reset signal 110 output from a timing control circuit 6 is used.

The recording state determination circuit 4b receives the signal output 32 from the reproduction amplifier 3a as the input and clamps, e.g., its positive peak value (corresponding to the recording data end time point) at the clamp point shown in FIG. 10D by using the determination circuits described with reference to FIGS. 3 and 4, and integrates a reproduction signal corresponding to the recording data 101 and obtained from the recording end time point to the next recording data start time point, thereby performing state detection. As the integration range, a signal obtained by inverting the reset signal 110 output from the timing control circuit 6 is employed.

The recording state determination circuits 4a and 4b output the detection signals respectively shown in FIGS. 10E and 10F as nondefective recording signals by using delayed recording data 102. A recording condition determination circuit 12 for determining the recording conditions receives the nondefective recording signals sent from the recording state determination circuits 4a and 4b as the inputs and outputs a defective recording signal especially when overwriting is performed.

More specifically, the recording condition determination circuit 12 can be constituted in the following manner. When a recording mark before overwriting is present near the front edge of the current recording mark, the reflected light does not have a positive peak, and thus the output from the recording state determination circuit 4a is 0. The output from the recording state determination circuit 4b is 1 since the reflected light has a negative peak. If the previous recording mark is present near the rear edge of the current recording mark, the reflected light has a positive peak, and thus the output from the recording state determination circuit 4a is 1. The output from the recording state determination circuit 4b is 0 sine the reflected light does not have a negative peak. Accordingly, if the recording condition determination circuit 12 is constituted by an OR circuit 12a and a shift register 12b that performs timing control, whether the recording conditions are satisfied can be determined. More specifically, when the previous recording mark and the current recording mark overlap completely, the reflected light does not have positive and negative peaks or has small positive and negative peaks. Thus, the outputs from the recording state determination circuits 4a and 4b are determined as 0. Hence, the output from the recording condition determination circuit is 0. In this case, defective recording is simply determined. The recording condition determination outputs of the previous and succeeding time periods are held in the shift register 12b. If outputs of a count equal to or more than a preset count are not 0, a defective recording signal is not output. In this manner, a defective recording signal 104 shown in FIG. 10I can be obtained from the delayed recording data 102 shown in FIG. 10H and the output from the OR circuit 12a shown in FIG. 10G.

Figure 9:
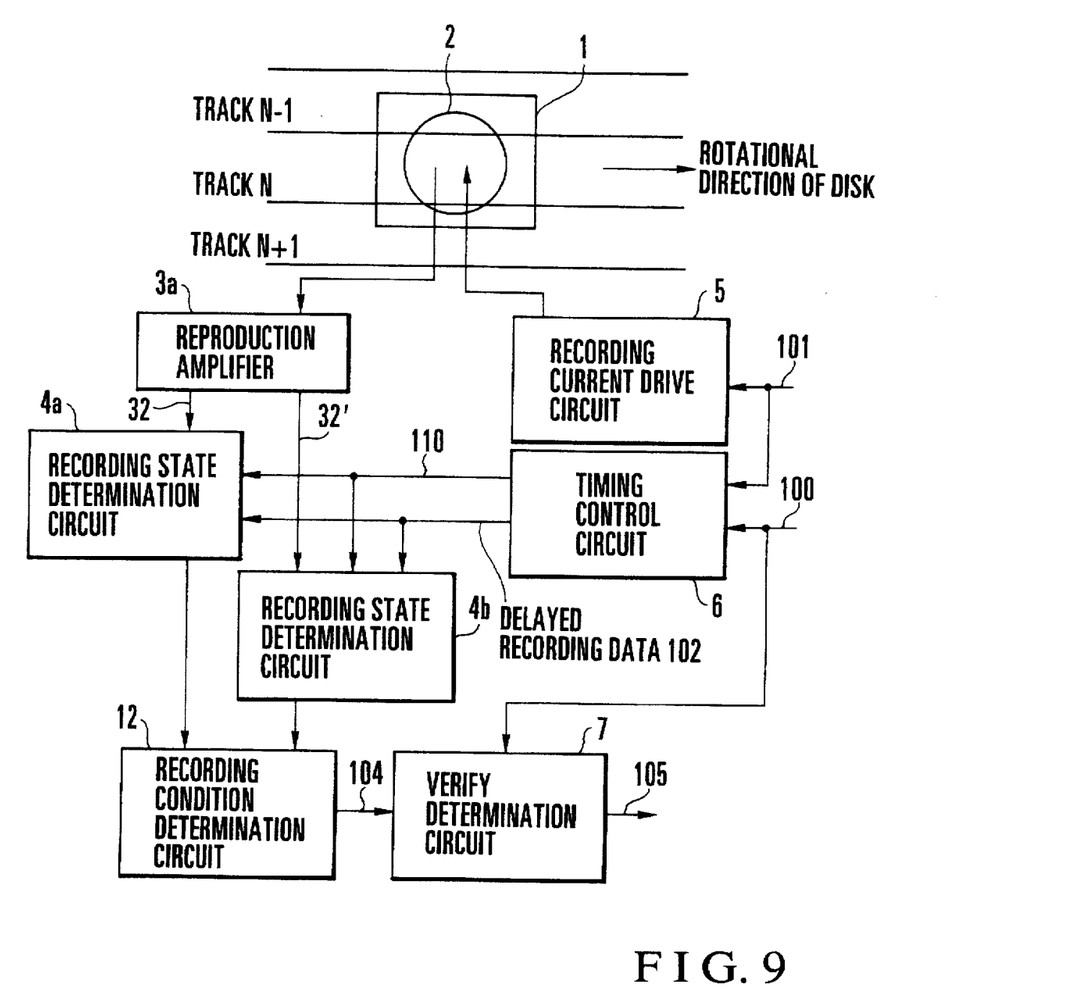
FIG. 9 is a block diagram showing a verify device according to the fourth embodiment of the present invention.

FIG. 9 shows a verify device according to the fourth embodiment of the present invention. The operation of this device will be briefly described by way of a phase change disk. The fourth embodiment is different from the third embodiment shown in FIG. 8 in that a verify determination signal 105 is output from a verify determination circuit 7 constituted by, e.g., a latch circuit and a counter circuit, based on a defective recording signal 104. The operation is the same as in FIGS. 10A to 10I until the defective recording signal 104 is output. The verify determination circuit 7 outputs the verify determination signal 105 when defective recording signals 104 of a count exceeding the count of defective recording signals which is set in the system in advance are counted. Whether the defective recording region is to be skipped or a normal verify operation (a fine verify operation which is performed after the disk is rotated for recording) is to be performed can be determined by, e.g., a preset counter count. Of course, when a fine verify operation is not performed but the defective recording region is skipped, this region is substituted as a substitute sector after the disk is rotated for recording. In this manner, the verify operation may be selected in terms of the recording speed, cost, reliability, and the like in accordance with the application of the optical disk device. In FIG. 9, the verify determination circuit 7 uses the recording clock 100 in order to improve the reliability. However, as the defective recording signal 104 is clock-synchronized, the clock 100 need not be used.

As described above, whether the conditions under which the recording mark is recorded on the recording medium, i.e., whether the thermal recording conditions of the medium, are satisfied, is monitored constantly, and whether the verify operation of the recording data is to be performed or the current sector is substituted as a substitute sector, and the like are determined.

Of the above embodiments, when the medium is a magneto-optical disk, a description is not made concerning whether the optical head employs a differential optical detection system or a single optical detection system. However, the same verify-while-recording operation can be performed in both cases. Also, of magneto-optical recording disks, a mark-edge recording disk and an overwritable mark-position recording phase change disk are enumerated. However, the present invention can similarly be applied to conventional mark-position recording on a magneto-optical disk, a non-overwritable phase change disk, and a writing-once disk, as a matter of course.

As has been described above, with the conventional verifying system, a fine verify operation cannot be performed until the disk is rotated for one revolution for data recording. In order to avoid this, in a verify operation which is performed with a two-beam optical head, a clock is extracted from the reproduction signal of the reproduction-only beam, and the recording data is delayed based on the extracted clock. Also, the reproduction data must be accurately detected, leading to an expensive device. In contrast to this, the verify device of the present invention does not require a clock extracting means and the like for performing the verify operation. As a result, the verify operation can be performed with a high reliability at a low cost.

The optical disk recording apparatus employing the present invention can be realized with the conventional one-beam optical head. Therefore, the machine cost required by a reproduction beam head, a servo circuit, a reproduction circuit, and the like can be greatly reduced. Also, the verify operation and the recording operation can be performed simultaneously, so that high-speed recording is enabled, thus improving the device performance.

In a readout signal obtained while recording, a noise source such as electric reverse of the recording data inevitably exists to produce a noise-superposed waveform. This can degrade the reliability of the verify-while-recording operation. However, in the present invention, since integral detection is performed, the superposed noise component is smoothed, thus improving the reliability.

Also, even when degradation of the optical head or the like occurs and the focused beam irradiates the magneto-optical disk medium in the defocused state, the quantity of light reflected by the magneto-optical disk medium is sometimes output correctly. Then, it can be erroneously determined that a verify operation need not be performed. In contrast to this, with the verify-while-recording device according to the present invention which detects a change in magneto-optical signal while recording, an increase in temperature of the magneto-optical disk recording medium can be detected, so that the reliability of the verify operation is improved.

What is claimed is:

1. A verify-while-recording device for an optical recording apparatus, comprising:

an optical head for recording recording data on an optical disk medium by using a recording beam;

signal reproducing means for reproducing the recording data from the recording beam that is being recorded on the optical disk and outputting a reproduction signal;

timing control means for outputting a control signal, a timing of which is controlled based on the recording data, and delayed recording data; and recording state determining means for detecting a state change in reproduction signal corresponding to the recording data and obtained from a start time point to a recording end time point, on the basis of the reproduction signal sent from said signal reproducing means and the control signal and a delayed control signal sent from said timing control means, and outputting a defective recording signal.

2. A device according to claim 1, further comprising verify determining means for determining whether one of skip of a defective recording sector region which is under recording and a normal verify operation of reading out and checking a recording state of the recording data recorded on the optical disk medium is performed when said recording state determining means outputs the defective recording signal.

3. A device according to claim 1, wherein said recording state determining means comprises clamp means for clamping a peak value of the reproduction signal sent from said signal reproducing means to a predetermined potential, integrating means for integrating a clamp output sent from said clamp means for a predetermined period of time and outputting an integral signal, threshold setting means for integrating the delayed recording data sent from said timing control means for a predetermined period of time and outputting a threshold signal, level detection means for detecting a level of the reproduction signal based on the integral signal sent from said integrating means and the threshold signal sent from said threshold setting means, and logic means for synchronizing a detection output sent from said level detection means with the delayed recording data sent from said timing control means and outputting a defective recording signal.

4. A device according to claim 3, wherein said recording state determining means comprises amplifying means for amplifying the reproduction signal sent from said signal reproducing means and outputting a reproduction signal which is set to a predetermined output amplitude to said integrating means.

5. A device according to claim 3, wherein said level detection means comprises a comparator for comparing amplitudes of the integral output sent from said integrating means and the threshold signal sent from said threshold setting means.

6. A device according to claim 3, wherein said level detection means comprises an arithmetic operation circuit for performing addition/subtraction of the integral signal sent from said integrating means and the threshold signal sent from said threshold setting means, and a comparator for comparing amplitudes of an output sent from said arithmetic operation circuit and a threshold voltage.

7. A device according to claim 3, wherein said threshold setting means comprises an integrator for integrating the delayed recording data sent from said timing control signal for a predetermined period of time in response to an external reset signal, and an amplifier for amplifying an integral output sent from said integrator based on an external gain setting signal and an offset signal and outputting a threshold signal.

8. A device according to claim 3, wherein said logic means comprises a latch circuit which latches the detection output sent from said level detection output and which is reset by a rear edge of the delayed recording data sent from said timing control means, and an EXOR circuit for obtaining an exclusive OR (EXOR) of an output from said latch circuit and the delayed recording data.

9. A verify-while-recording device for an optical recording apparatus, comprising:

an optical head for recording recording data on an optical disk medium by using a recording beam;

signal reproducing means for reproducing the recording data from the recording beam that is being recorded on the optical disk and outputting a reproduction signal;

timing control means for outputting a control signal, a timing of which is controlled based on the recording data, and delayed recording data;

first recording state determining means for detecting a state change in reproduction signal and obtained from a recording start time point of the recording data to a recording end time point thereof, on the basis of the reproduction signal sent from said signal reproducing means and the control signal and a delayed control signal sent from said timing control means;

second recording state determining means for detecting a state change in reproduction signal obtained from a recording end time point of the recording data to a recording start time point thereof, on the basis of the reproduction signal sent from said signal reproducing means and the control signal and the delayed control signal sent from said timing control means; and recording condition determining means for outputting a defective recording signal in accordance with outputs from said first and second recording state determining means.

10. A device according to claim 9, further comprising verify determining means for determining whether one of skip of a defective recording sector region which is under recording and a normal verify operation of checking a recording state of the recording data recorded on the optical disk medium is performed when said recording condition determining means outputs the defective recording signal.

11. A device according to claim 9, wherein said recording condition determining means comprises an OR circuit for obtaining an OR of outputs from said first and second recording state determining means and a shift register for outputting the defective recording signal when said OR circuit outputs binary signals, indicating defective recording in previous and succeeding time periods, more than a predetermined number of times.

* * * * *